United States Patent
Egglhuber (10) Patent No.: US 6,234,159 B1
(45) Date of Patent: *May 22, 2001

(54) WIRE SAW AND PROCESS FOR CUTTING OFF SHAPED ARTICLES

(75) Inventor: Karl Egglhuber, Hebertsfelden (DE)

(73) Assignee: Wacker Siltronic Gesellschaft für Halbleitermaterialien AG, Burghausen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,658

(22) Filed: Sep. 10, 1998

(30) Foreign Application Priority Data

Sep. 11, 1997 (DE) .............................. 197 339 66

(51) Int. Cl.$^7$ ........................................ B28D 1/06
(52) U.S. Cl. ................. 125/16.02; 125/21; 125/16.01; 451/796; 451/309
(58) Field of Search ................. 125/16.2, 21, 16.01; 451/296, 309

(56) References Cited

U.S. PATENT DOCUMENTS

| | | | |
|---|---|---|---|
| 4,903,682 | * | 2/1990 | Kurokawa . |
| 5,609,148 | | 3/1997 | Mitwalsky et al. . |
| 5,628,301 | * | 5/1997 | Katamachi . |
| 5,839,425 | * | 11/1998 | Toyama et al. . |
| 5,944,007 | * | 8/1999 | Miyoshi et al. . |

* cited by examiner

Primary Examiner—Joseph J. Hail, III
Assistant Examiner—Willie Berry, Jr.
(74) Attorney, Agent, or Firm—Collard & Roe, P.C.

(57) ABSTRACT

A wire saw for cutting shaped articles from a workpiece, having at least two wire webs made from sawing wire, which are used for cutting off the shaped articles and which lie one above the other at a distance h and are tensioned between wire-guide rollers. The wire webs are formed by one or more adjacent and parallel wire segments. In this wire saw, no wire segment covers any other wire segment congruently when the wire webs are viewed from above. The invention also relates to a process for cutting a workpiece with the wire saw.

14 Claims, 6 Drawing Sheets

WIRE SAW AND PROCESS FOR CUTTING OFF SHAPED ARTICLES

BACKGROUND OF THE INVENTION

1. Field of the Invention

The invention relates to a wire saw and a process for cutting shaped articles from a workpiece.

2. The Prior Art

Wire saws are used to cut a multiplicity of semiconductor wafers from a crystal in one operation. Wire saws of this kind have a wire web, which is formed by a sawing wire wound round two or more wire-guide rollers. The sawing wire may be covered with a coating. With wire saws having a sawing wire which does not have fixedly bonded abrasive grain, abrasive grain is supplied during the cutting operation in the form of a suspension or slurry. During the cutting operation, the workpiece passes through the wire web, in which the sawing wire is arranged in the form of parallel adjacent wire segments. The workpiece is made to pass through the wire web by a feed device which guides the workpiece onto the wire web or the wire web onto the workpiece. It is advantageous for the direction of movement of the wire segments to be changed constantly by periodically changing the direction of rotation of the wire-guide rollers, i.e., the oscillating operation, in order to allow the cutting slurry to be supplied from both sides. In this way, it is possible to produce wafers of improved geometry (TTV, warp).

The thickness of the cut shaped articles is fixed by selecting the distance between the parallel wire segments. This distance is limited as one moves toward smaller amounts by the fact that the sawing wire runs in grooves formed in the wire-guide rollers. The grooves require comparatively large amounts of space and cannot be arranged as close together as desired without impairing their wire-guiding properties. The thickness of semiconductor wafers should therefore not fall below a certain minimum thickness, even though this might be useful to conserve material. Furthermore, the wire saws described can generally only be used to produce disk-like shaped articles having parallel side faces.

SUMMARY OF THE INVENTION

It is therefore an object of the present invention to provide a wire saw which can be used without the abovementioned limitations.

The invention relates to a wire saw for cutting shaped articles from a workpiece, having at least two wire webs made from sawing wire, which are used for cutting off the shaped articles. The wire webs lie one above the other at a distance h and are tensioned between wire-guide rollers. The wire webs are formed by one or more adjacent and parallel wire segments, wherein no wire segment covers any other wire segment congruently when the wire webs are viewed from above.

The invention also relates to a process for cutting shaped articles from a workpiece, using a wire saw having at least two wire webs made from sawing wire. The wire webs lie one above the other at a distance h and are tensioned between wire-guide rollers. The wire webs are formed by one or more adjacent and parallel wire segments. The shaped articles are shaped in a single operation by the action of the wire webs.

With the present invention, it is possible to divide crystals of semiconductor material into comparatively thin semiconductor wafers. However, it is also possible to produce shaped articles of different shapes from these crystals. These shaped articles may also consist of a different material. A wide variety of possibilities are available when selecting the shape of the shaped articles.

According to the invention, two or more wire webs are stacked one above the other at a short distance from one another. It is possible to move one or more of the wire webs before and during the cutting operation, if desired. The wire webs are intended to longitudinally displace and rotate the wire-guide rollers of the wire webs, while preferably remaining in the planes in which they are arranged while the movements take place.

Moreover, it is also possible for tilting movements to be provided, causing the wire segments to leave these planes entirely or partially. The rotation of a wire web can be achieved by rotating the wire-guide rollers that tension the wire webs. Wire segments can also be rotated through a small angle of rotation by axially displacing one wire-guide roller. Correspondingly, the wire segments of a wire web may also be tilted by displacing only one wire-guide roller of the wire web perpendicular to the plane of the wire web.

A wire web generally comprises a plurality of wire segments which lie parallel to one another and are tensioned between two wire-guide rollers and intersect the wire-guide rollers perpendicularly in the longitudinal direction. Furthermore, the invention also relates to wire saws with wire webs which are formed by only one single wire segment.

The wire segments in the wire webs lying one above the other are arranged in such a manner that at most only one wire segment of a wire web lies completely in a plane which perpendicularly intersects the planes of the wire webs. This means that the wire segments of different wire webs, when the wire webs are viewed from above, either lie parallel to one another or run at a certain angle toward one another or intersect one another. However, one wire segment never lies congruently above another wire segment. During the cutting operation, the workpiece is divided into the planned shaped articles in a single operation with the wire segments of the superposed wire webs engaging in the workpiece.

Wire saws according to the invention may comprise one or more roller systems, with one roller system comprising two or more wire-guide rollers around which a sawing wire is wound.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
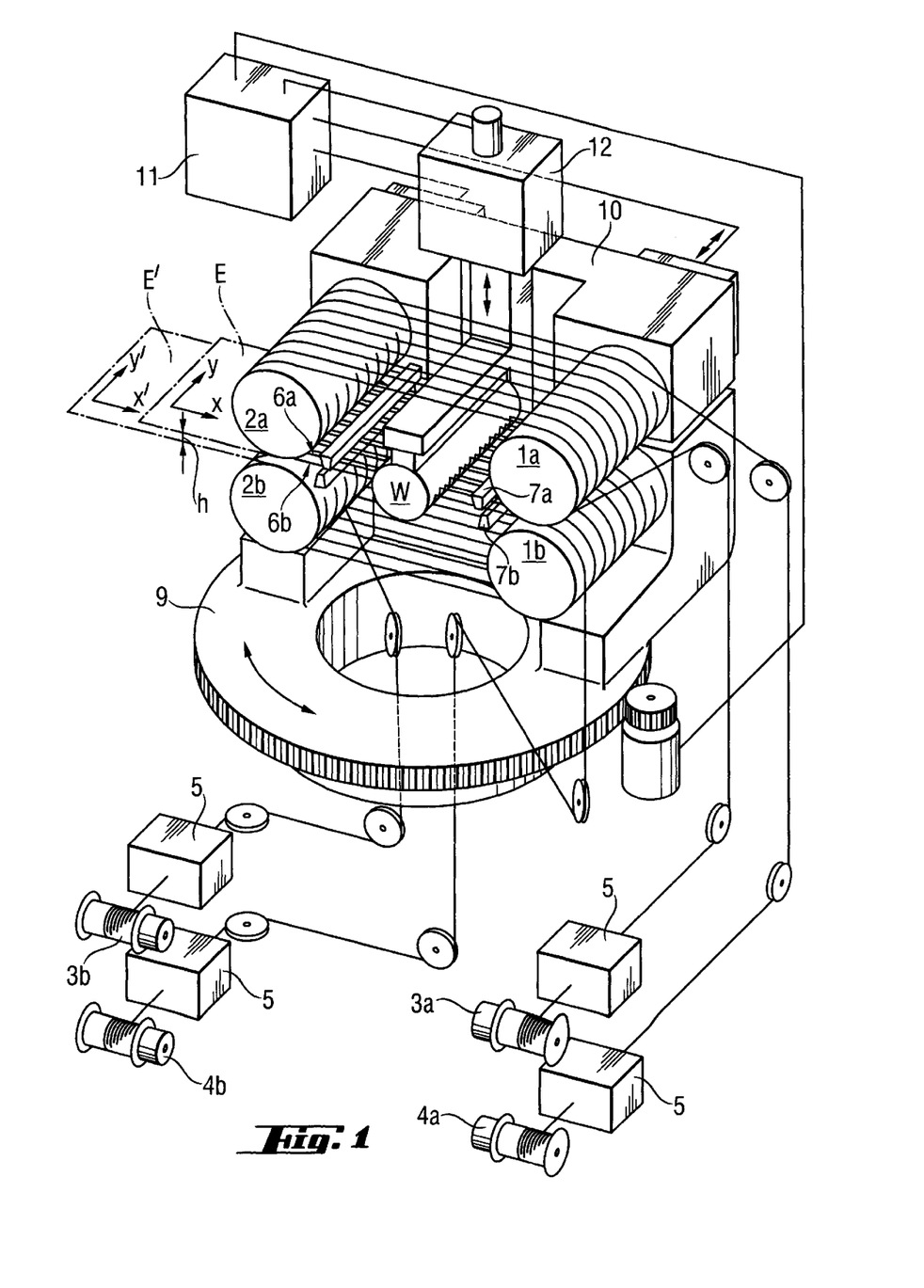
FIG. 1 shows a schematic view of a preferred embodiment of a wire saw with two wire webs.

Referring now in detail to the drawings and, in particular, FIG. 1, there is shown a wire saw comprising two roller systems 1a and 1b, which are driven independently of one another. Each roller system 1a and 1b has two rotatably mounted wire-guide rollers 2a and 2b, around each of which systems a sawing wire is wound. During operation of the wire saw, the sawing wire running around one roller system is unwound from a stock reel 3a and 3b and is wound onto a receiving reel 4a and 4b. This operation is assisted by devices 5 which are known per se for laying wire and controlling the tension of the wire.

As an alternative to the two roller systems with two sawing wires, the wire saw shown may also be operated with only one saw wire. In this case, only one winding and unwinding reel are required.

In each roller system, the sawing wire, which is tensioned between two wire-guide rollers forms wire webs in the form of parallel and wire segments. The wire segments of a wire web lie in one plane and are oriented perpendicular to the longitudinal axes of the wire-guide rollers. The wire saw illustrated has four wire webs. The two wire webs 6a and 6b which belong to different roller systems lie one above the other, at a short distance h from one another. In order to cut semiconductor wafers from a crystal, it is preferable that 0 mm<h≦$d_k$, particularly preferably $d_k$+3%<h≦$d_k$, where $d_k$ is the diameter of the crystal or the longest dimension of the crystal in the cutting direction. When using sawing wire that is not covered with bonded-on abrasive grain, distributor bars 7a and 7b are provided, through which a sawing slurry is guided to the wire segments of the wire webs 6a and 6b during the cutting operation. Wire webs 6a and 6b are arranged in a plane E and E', respectively, the planes being defined by orthogonal pairs of axes x and y and x' and y', respectively. The longitudinal axes of the wire-guide rollers and of the wire segments of the wire webs lie on or parallel to the respective pairs of axes.

In the embodiment of the wire saw illustrated in FIG. 1, wire web 6b can be rotated and wire web 6a can be displaced. The rotation of the wire web takes place by rotating the wire-guide rollers of the wire web using a rotation device 9. Rotation through a small angle of rotation can also be achieved by axially displacing a wire-guide roller. A displacement of wire web 6a through a distance of offset in the y-direction is effected by axially displacing the wire-guide rollers of the wire web with a displacement device 10. The rotation and displacement of the wire webs before and during the operation of cutting shaped articles from a workpiece is controlled automatically, in accordance with a predetermined program, with the aid of a control device 11 which also monitors the movements of a feed device 12.

The directions of movement of the wire segments in the wire webs 6a and 6b depend on the direction of rotation of the rotating wire-guide rollers and may be in opposite directions or in the same direction. Opposite directions of movement are preferred especially in the production of semiconductor wafers, because they ensure a uniform distribution of the sawing slurry. This has a beneficial effect on the desired parallelism of the sides of the semiconductor wafers. As a result, it is possible to dispense with constantly changing the direction of rotation or oscillating operation of the wire-guide rollers.

Figure 2:
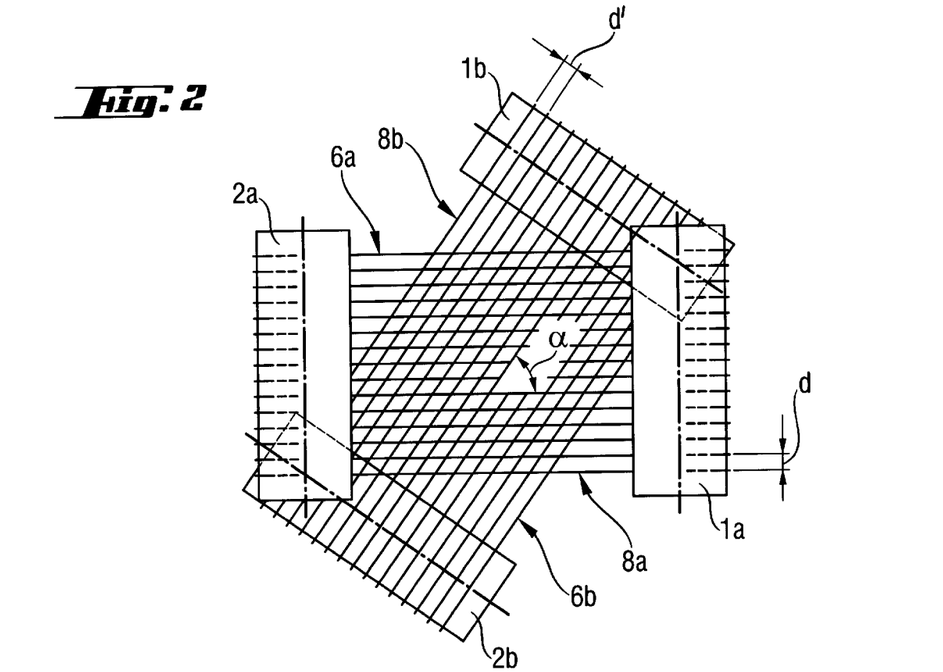
FIG. 2 shows a top view of a possible arrangement of the wire webs.

In FIG. 2, the wire web 6b is shown rotated through an angle 0° <α<90°. An angle of rotation a is given as the measure of the rotation. If α=0°, the wire segments of the two wire webs are arranged parallel to one another, when the wire webs are viewed from above. If α=90°, the wire segments of the wire webs intersect one another at right angles. Adjacent wire segments 8a, 8b, respectively, in the wire webs 6a and 6b are spaced apart at a distance d or d', respectively.

Figure 3A:
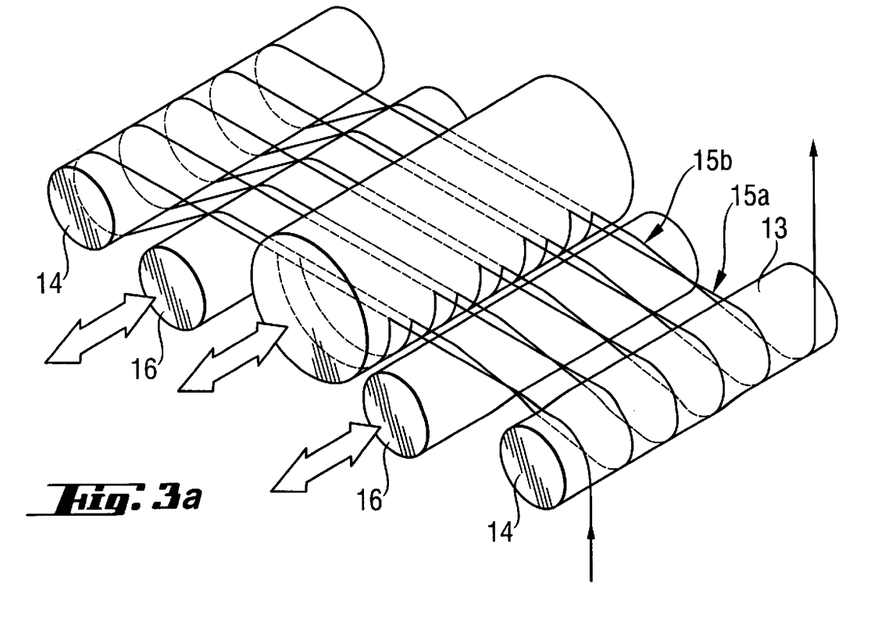
FIGS. 3a, 3b and 3c show further embodiments of the wire saw.

A further embodiment of the invention is illustrated in FIG. 3a. The wire saw shown comprises a roller system 13 with wire-guide rollers 14 which tension two wire webs 15a and 15b which lie one above the other. Furthermore, two further, axially displaceable wire-guide rollers 16 are provided, by means of which the distance between the wire webs 15a and 15b can be reduced and the wire web 15b can be displaced in the longitudinal direction of these wire-guide rollers.

It is also possible to provide a further pair of wire-guide rollers which act on the wire web 15a in a corresponding manner and, if appropriate, replace the wire-guide rollers 16. A wire web can be rotated through a small angle of rotation by axially displacing one of the wire-guide rollers 16. The wire saw illustrated is suitable for cutting thin semiconductor wafers from a crystal. It is particularly advantageous that before cutting off the semiconductor wafers, a specific wafer thickness is set by axially displacing the wire-guide rollers 16 without the need for a time-consuming change of wire-guide rollers. However, there is also the possibility that two types of semiconductor wafers of different thicknesses are produced during the cutting operation.

The directions of movement of the wire segments in the wire webs 15a and 15b are oppositely directed. This has a beneficial effect on the geometry of the shaped parts, since the sawing slurry can always be fed into the workpiece from both sides simultaneously. As a result, it is not necessary to constantly change the direction of rotation of the wire-guide rollers.

Figure 3B:
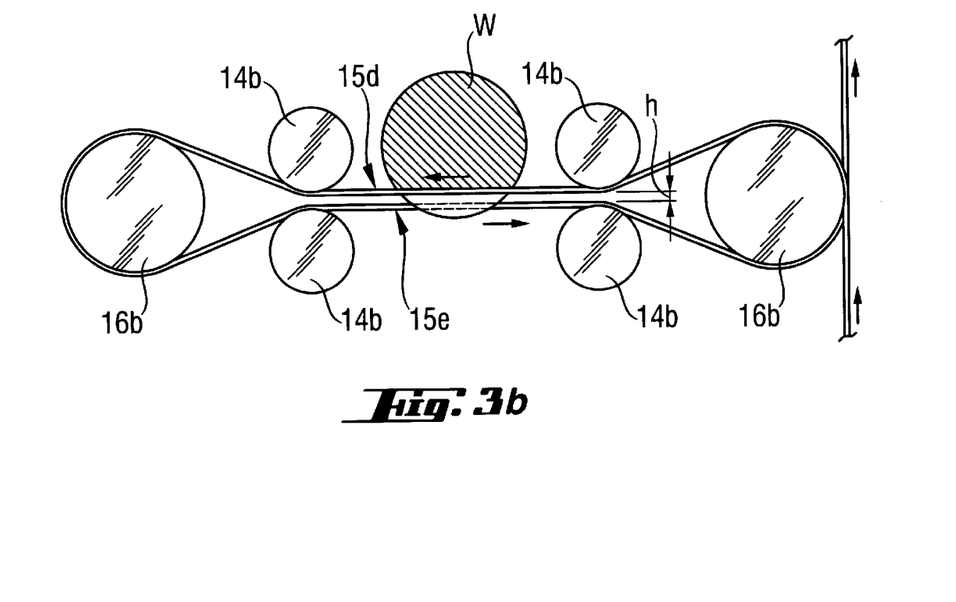

A further embodiment is illustrated in FIG. 3b. The wire is wound onto the wire-guide rollers 14b and 16b in so that two wire webs 15d and 15e, which lie one above the other at a distance h, are formed and the wire between the wire-guide rollers 14b and 16b is guided to the next groove. Here too, the directions of movement of the wire segments of the wire webs 15d and 15e are oppositely directed, with the result that there is no need to constantly change the direction of rotation. By axially displacing one or more wire-guide rollers before or during cutting, it is possible to produce shaped parts of different wafer thickness or shaped parts with non-parallel side faces.

Figure 3C:
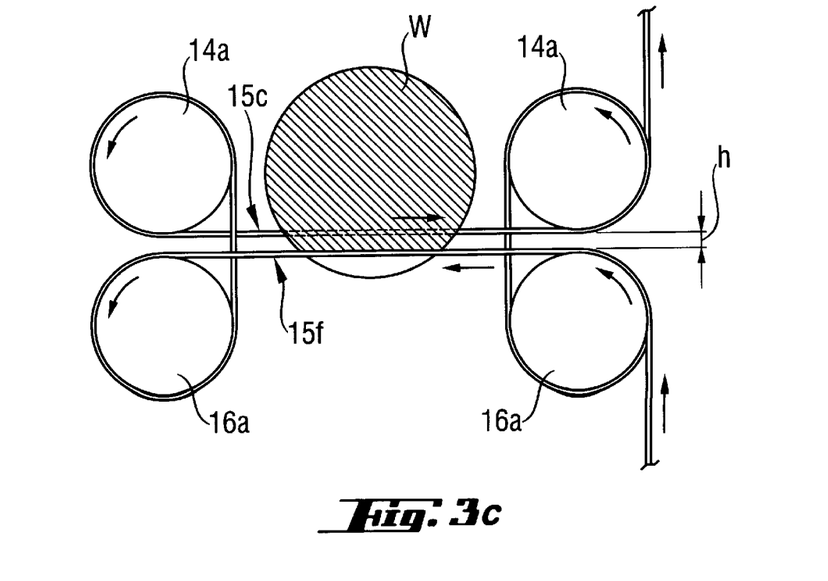

A further embodiment is illustrated in FIG. 3c. The wire is wound onto the wire-guide rollers 14a and 16a in such a manner that two wire webs 15c and 15f, which lie one above the other at a distance h, are formed and in such a manner that the wire is guided from the wire-guide rollers 14a, between the wires of the wire webs 15c and 15f, to the wire-guide rollers 16a and to the next axial groove. Here too, the directions of movement of the wire segments 15c and 15f are oppositely directed, with the result that the sawing slurry can be fed from both sides in order to improve the geometry.

As a result, it is possible to dispense with a constant change in the direction of rotation of the wire-guide rollers. By axially displacing one or more wire-guide rollers before or during cutting, it is possible to produce shaped parts of different wafer thickness or shaped parts with non-parallel side faces.

The invention is not limited to two wire webs which lie one above the other at a short distance from one another. It is also possible for a plurality of, preferably two to four, wire webs to be arranged one above the other, in which case each of the wire webs can be moved in the manner described before and during a cutting operation.

Figure 4:
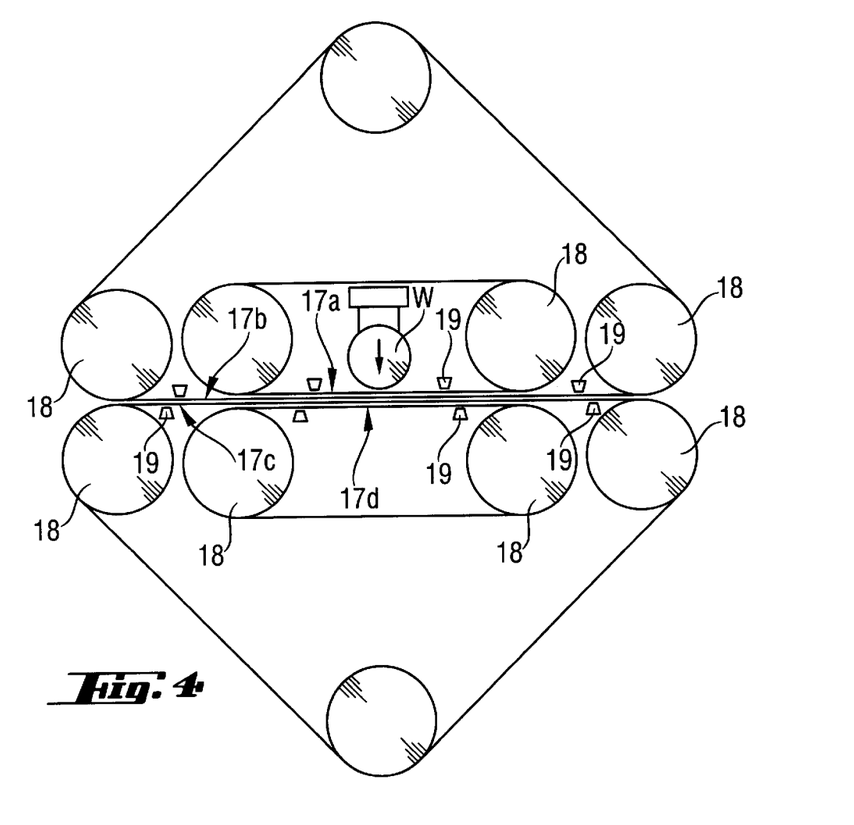
FIG. 4 shows a side view of the embodiment of a wire saw with four wire webs which are arranged one above the other at a short distance apart.

FIG. 4 shows an embodiment with four wire webs 17a, 17b, 17c and 17d which lie one above the other. Each of the wire webs is assigned its own roller system with three or two wire-guide rollers 18. When the wire webs are viewed from above, no wire segment of one wire web lies congruently above a wire segment of another wire web. A workpiece W is guided successively through each of the wire webs. Distributor bars 19 are arranged on both sides of the stack of wire webs, through which a sawing slurry, which is used to wet the wire segments of the wire webs, is supplied.

The invention allows the production of shaped articles with a virtually unlimited range of possible shapes. The shape of the shaped articles is affected essentially by the spatial position of the wire webs before the cutting operation and by the movements the wire webs execute during the cutting operation.

Furthermore, the shape of the workpiece is also taken into account if not all the contours of the workpiece are altered by the action of the sawing wire. If an angle of offset $\alpha>0°$ is set, it is possible to recognize when the wire webs are viewed from above that the intersecting wire segments form rhombic to rectangular patterns, depending on the angle of offset. If the base surface of the workpiece completely covers such a pattern during the cutting operation, the action of the wire segments which form the pattern produce a shaped article with a cross section corresponding to this pattern (on the assumption that the wire webs are not moved during the cutting operation). If the workpiece does not completely cover a pattern, parts of the contour of the workpiece are retained. This can be utilized, for example, to produce shaped articles with a wedge-shaped cross section.

Figure 5:
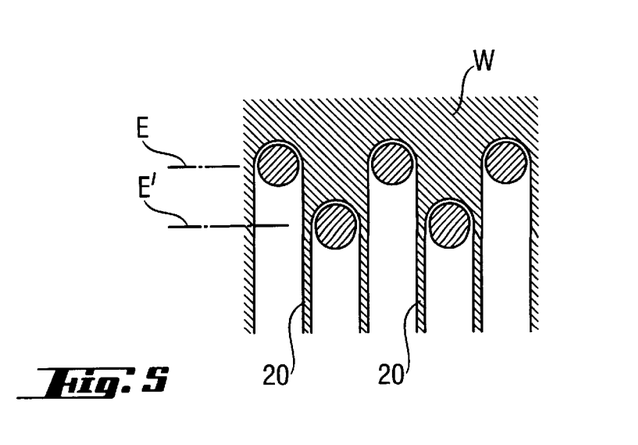
FIGS. 5 to 9 show selected shaped articles which can be produced with the aid of a wire saw according to the invention.

Particularly thin semiconductor wafers with planar and parallel sides are cut from a cylindrical workpiece such as a single crystal. As illustrated in FIG. 1, the workpiece W is guided onto the wire webs 6a and 6b with the aid of the feed device 12. As shown in FIG. 5, thin semiconductor wafers 20 are obtained if the distance between wires in the wire webs is equal (d=d'), the wire webs are not rotated with respect to one another ($\alpha=0°$), the distance of offset is equal to half the distance between wires and this condition is maintained during the cutting operation.

Figure 6:
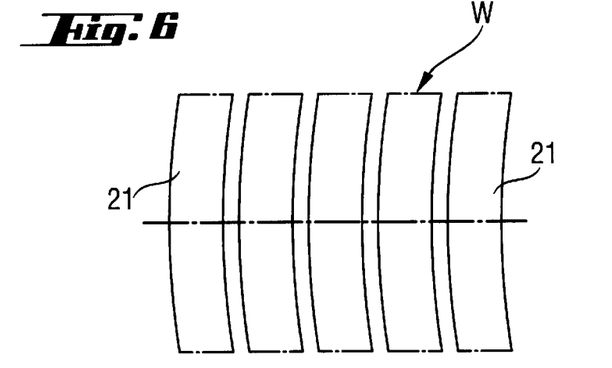

If wire webs 6a and 6b of a wire saw in accordance with FIG. 1 are displaced in the longitudinal direction of the wire-guide rollers 2a and 2b during the cutting operation, it is possible to obtain thin wafers 21 with parallel and curved sides as shown in FIG. 6.

Figure 7:
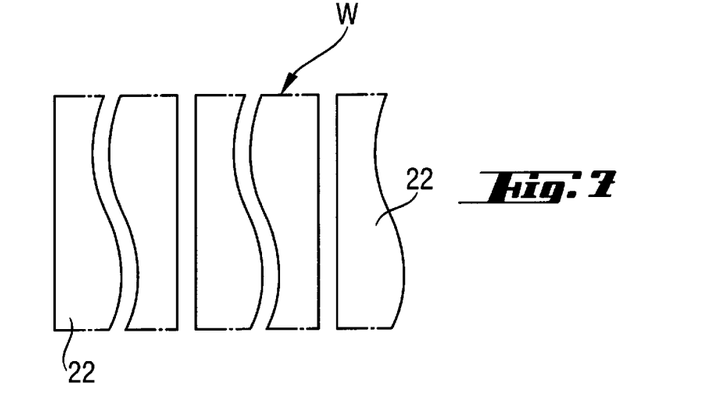

If only one wire web is displaced during the cutting operation, for example the wire web 6a of a wire saw in accordance with FIG. 1 or the wire web 15b of a wire saw in accordance with FIG. 3, the result is thin wafers with two different sides, for example wafers 22 with sides of planar and wavy profiles as shown in FIG. 7.

Figure 8:
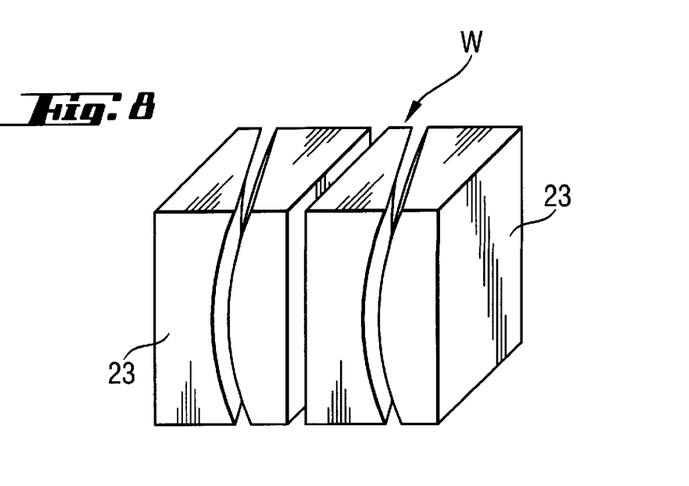

As shown in FIG. 8, it is also possible to obtain shaped articles with a wedge-shaped cross section. They are formed if an acute angle of offset a is set and maintained during the cutting operation and the workpiece covers wedge-shaped sections of the patterns which can be seen when the wire webs are viewed from above. If, the wire-guide rollers of a wire web are axially displaced during the cutting operation, the wedge-shaped articles 23 with planar and curved sides are produced.

Figure 9:
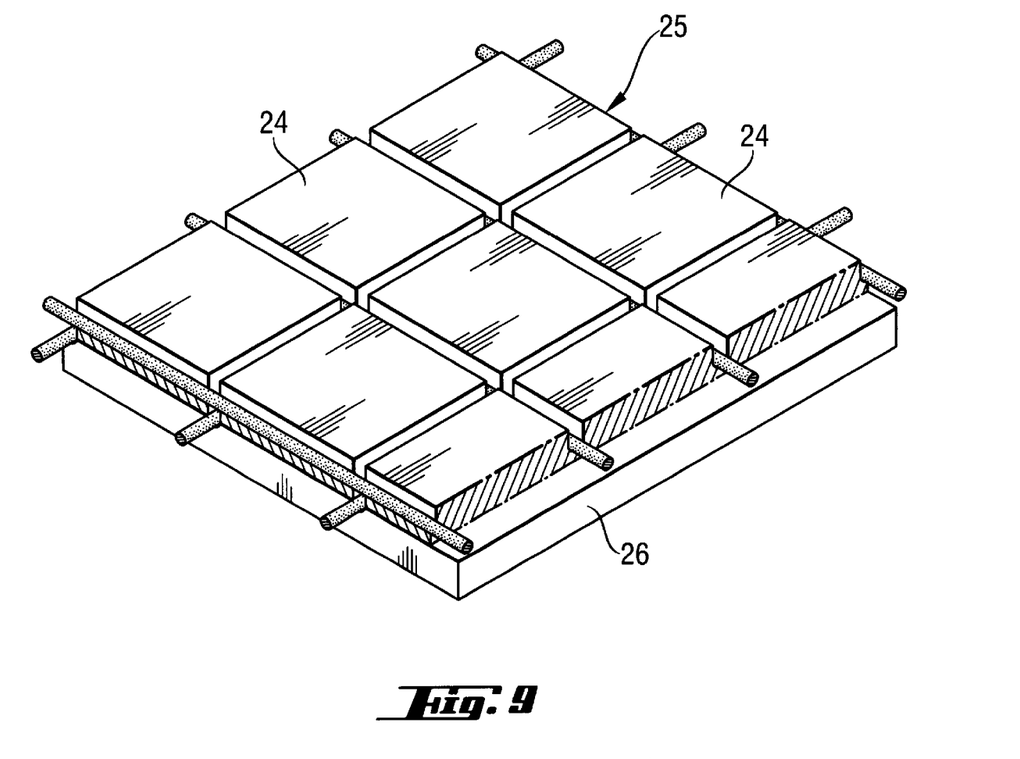

A further example relates to the production of thin plates 24, shown in FIG. 9, in particular of rectangular or square substrates which support electronic components. They are usually cut using a saw with external cutting blades, i.e., a dicing saw, from a substrate wafer 25. The invention allows the plates to be cut off in a single operation. If desired, the thickness of the substrate wafer can be increased by temporarily bonding the substrate wafer to a backing 26 into which the wire segments of the wire webs can penetrate. To produce the plates, a wire saw in which a wire web is rotated through $\alpha=90°$ is used.

Accordingly, while only a few embodiments of the present invention have been shown and described, it is obvious that many changes and modifications may be made thereunto without departing from the spirit and scope of the invention.

What is claimed is:

1. A wire saw for cutting shaped articles from a workpiece, comprising:

at least two wire webs made from sawing wire, said webs lying one above the other at a distance h and being tensioned between wire-guide rollers, each of said wire webs being formed by adjacent and parallel wire segments, wherein no wire segment covers any other wire segment congruently when said wire webs are viewed from directly above at a 90 degree angle to said wire webs and the distance h being smaller than a thickness of the workpiece so that the at least two wire webs engage in the workpiece when the shaped articles are cut, and said wire saw further comprising a control device moving at least one of the at least two wire webs during the cutting of the shaped articles in a predetermined manner, in addition to movement of the wire which is caused by a rotation of the wire-guide rollers.

2. The wire saw as claimed in claim 1, wherein the control device moves the at least one of the at least two wire webs in a plane in which the wire web is arranged.

3. The wire saw as claimed in claim 1, wherein the wire-guide rollers of each wire webs belongs to a separate roller system, each roller system using a dedicated sawing wire.

4. The wire saw as claimed in claim 1, wherein the wire-guide rollers of the wire webs belong to a single roller system using one sawing wire.

5. A process for cutting shaped articles from a workpiece, comprising cutting the workpiece in a single operation to form the shaped articles with a wire saw having at least two wire webs made from saw wire, the webs lying one above the other at a distance h and being tensioned between wire-guide rollers, each wire web being formed by parallel adjacent wire segments, wherein the at least two wire webs engage in the workpiece during the single operation and at least one of the at least two wire webs is moved during the cutting of the shaped articles.

6. The process as claimed in claim 5, further comprising bringing the wire webs into a defined, relative spatial position with respect to one another for displacement and rotation prior to the step of cutting the workpiece.

7. The process as claimed in claim 5, wherein the moving is effected by rotating one of the at least two wire webs through an angle of offset $\alpha$, the rotation taking place in a plane in which the wire web is arranged.

8. The process as claimed in claim 5, wherein the moving is effected by displacing one of the at least two wire webs in the longitudinal direction of the wire-guide rollers of the wire web, the displacement taking place in a plane in which the wire web is arranged.

9. The process as claimed in claim 5, further comprising moving the wire segments of one wire web in a direction opposite to the direction of the wire segments of a wire web lying at a distance h from the one wire web.

10. A wire saw for cutting shaped articles from a workpiece, comprising:
at least two wire webs made from sawing wire, said webs lying one above the other at a distance h and being tensioned between wire-guide rollers, each of said wire webs being formed by adjacent and parallel wire segments, wherein no wire segment covers any other wire segment congruently when said wire webs are viewed from above and the distance h is smaller than a thickness of the workpiece so that the at least two wire webs engage in the workpiece when the shaped articles are cut, and wherein the wire webs are offset with respect to one another when looking from above at a 90 degree angle to said wire webs.

11. A wire saw according to claim 10, wherein the wire webs are offset with respect to one another by a distance that is equal to half of the distance between adjacent wire segments.

12. A process for cutting wafers from a workpiece, comprising cutting the workpiece in a single operation to form the wafers with a wire saw having at least two wire webs made from saw wire, the webs lying one above the other at a distance h and being tensioned between wire-guide rollers, each wire web being formed by parallel adjacent wire segments, wherein the at least two wire webs engage in the workpiece during the single operation, and the wire webs are offset with respect to one another when looking from above at a 90 degree angle to said wire webs.

13. A process according to claim 12, wherein the wire webs are offset with respect to one another by a distance that is equal to half of the distance between adjacent wire segments.

14. The process as claimed in claim 5, wherein the moving is effected by tilting one of the at least two wire webs.

* * * * *

UNITED STATES PATENT AND TRADEMARK OFFICE
CERTIFICATE OF CORRECTION

PATENT NO. : 6,234,159 B1
DATED : May 22, 2001
INVENTOR(S) : Karl Egglhuber

It is certified that error appears in the above-identified patent and that said Letters Patent is hereby corrected as shown below:

<u>Title page,</u>
Column 1, Item [30], please change to:

-- Sep. 11, 1997        [DE] ............... 197 39 966 --

Signed and Sealed this

Twenty-sixth Day of March, 2002

Attest:

JAMES E. ROGAN
*Attesting Officer*            *Director of the United States Patent and Trademark Office*